March 6, 1973 — J. S. PALM — 3,719,382

CAMPER HOLD-DOWN BRACKET

Filed Aug. 2, 1971

INVENTOR.
JOHN STANLEY PALM
BY Henderson and Strom

United States Patent Office 3,719,382
Patented Mar. 6, 1973

3,719,382
CAMPER HOLD-DOWN BRACKET
John Stanley Palm, R.R. 1, Altona, Ill. 61414
Filed Aug. 2, 1971, Ser. No. 168,198
Int. Cl. B62d 21/14
U.S. Cl. 296—23 MC                                    3 Claims

ABSTRACT OF THE DISCLOSURE

A bracket is clamped by bolts directly to the frame of a pickup truck, and it supports a removable extension bar extending outwardly below the body of the truck. The outer end of the extension bar and the overhanging portion of a pickup camper are connected by a usual chain and turnbuckle combination. The only force applied by the bracket to the body of the truck is the downward force applied to the camper. The extension bar is readily removable so that it does not deface the appearance of the pickup nor interfere with usual clearance during normal use of the truck.

BACKGROUND OF THE INVENTION

This invention pertains to brackets for applying a force downwardly on a camper to retain it on the bed of a pickup truck.

Campers are commonly supplied with eye bolts that extend downwardly near the outer edges of the bottom panels of their cantilever wings or overhanging portions that extend over the sides of pickup boxes. An eye bolt or a bracket may be fastened to the sides of a pickup below each of the eye bolts that protrude from the camper, and a turnbuckle, and usually a chain, is connected between each eye bolt and the respective bracket to hold the camper down. Rather than attaching brackets permanently to the sides of the body of the pickup, removable brackets that connect to the upper edges of the pickup box have been proposed in U.S. Pat. 3,489,454 issued to E. E. Manteufel on Jan. 13, 1970, and also in U.S. Pat. 3,356,408 issued to H. D. Stutz on Dec. 5, 1967. The force that can be applied by these brackets is limited by the strength of the portion of the box to which they are attached.

In U.S. Pat. 3,368,785 issued to R. C. Weiler on Feb. 13, 1968, the bracket is shown connected underneath the box of the pickup. This bracket has an advantage in that the exterior surface of the pickup body need not be defaced to attach a bracket, and the bracket can be quite readily removed when the camper is not mounted on the pickup truck. The inward end of the bracket is hooked over the top of the frame of the pickup, and a post extends upwardly from an intermediate part of the bracket to press against the bottom of the pickup box. When a turnbuckle in series with a chain connected between the outer end of the bracket and the camper is tightened, the post is pressed up against the bottom of the pickup bed while the inner end of the bracket is pressed down on the frame of the pickup. Therefore, the bracket exerts an upward force on the bed of the pickup that tends to raise the body of the truck above its frame.

SUMMARY OF THE INVENTION

An object of this invention is to provide increased safety and stability by tying a pickup camper directly to the frame of a pickup;

Another object is to provide a bracket that does not deface the body of the pickup; and Still another object is to provide an extension to the bracket that is easily removable so that the bracket is not noticeable on the pickup, or in the way when it is not in use.

The bracket of this invention has a vertical portion that can be securely bolted directly to the frame of a pickup at a point just back of its cab, and it has a horizontal portion that extends outwardly underneath the body of the pickup. The horizontal portion is a rectangular hollow piece, and an extension bar fits within the horizontal portion to extend the bracket beyond the body so that the outer end of the extension bar is below an eye that is mounted on the bottom of the overhanging portion of the camper. The eye on the pickup and the outer end of the extension bar are connected in a usual manner by a chain and a turnbuckle. This bracket provides a safer mounting than those that have generally been used. When the camper is removed, the extension bar can be easily and quickly removed, and the remaining portion of the bracket that is secured to the frame is not conspicuous.

DESCRIPTION OF THE PREFERRED EMBODIMENT

Figure 1:
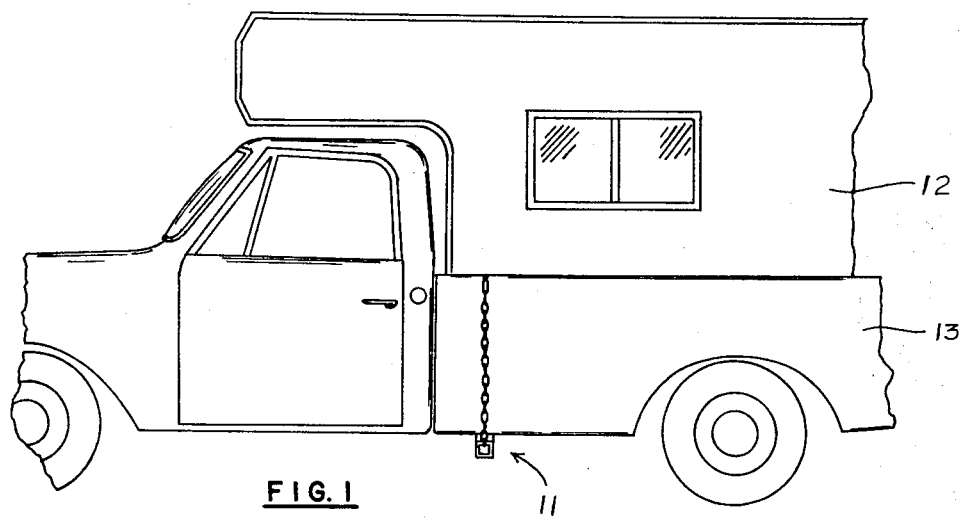
FIG. 1 is a side view of a camper to show the location of the mounting of a hold-down bracket of this invention.
Figure 2:
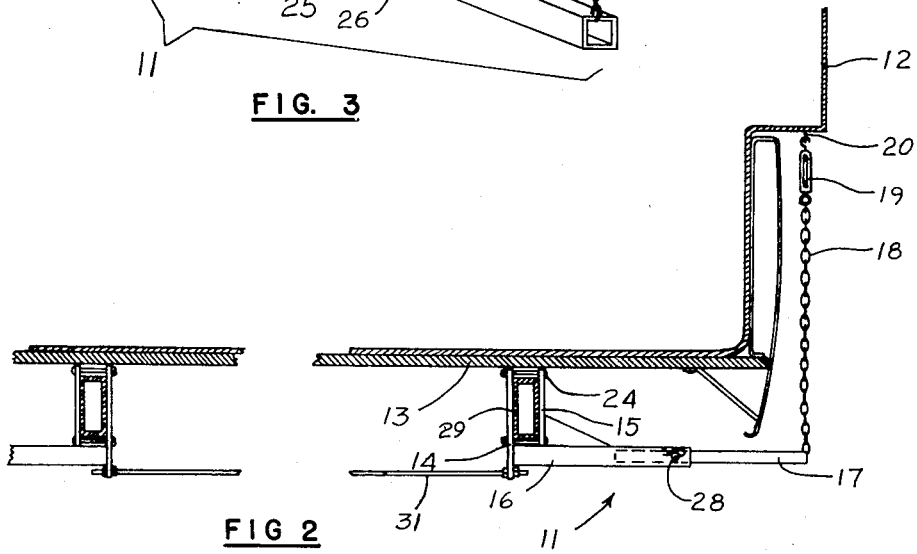
FIG. 2 is an oblique view of the bracket as it appears when it is disassembled.

In FIG. 1, a bracket 11 is connected to the frame of a pickup truck and is also connected to the bottom of the overhanging portion of a camper to hold the camper firmly to the box 13 of the truck. As shown in FIG. 2, the bracket 11 has two vertical portions or arms 14 and 15 secured to the frame 29 of the chassis of the pickup truck and a horizontal portion 16 with an extension bar 17 extending outwardly below the body of the truck such that the outer end of the extension bar 17 is positioned below the overhanging side of the camper 12. The outer end of the extension bar 17 is connected in a usual manner through a chain 18 and a turnbuckle 19 to an eye bolt 20 mounted to the bottom of the overhanging side of the camper 12.

Figure 3:
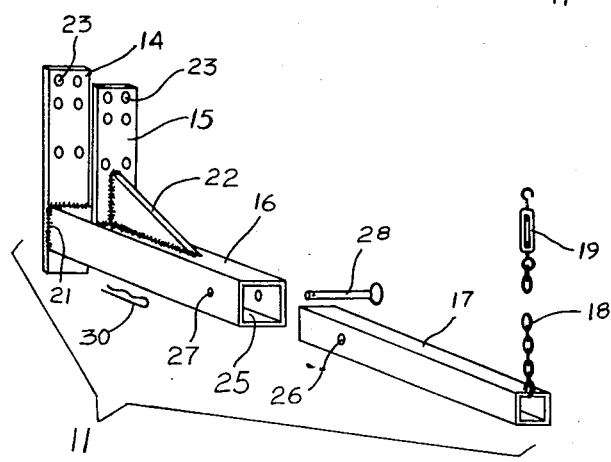
FIG. 3 is a fragmentary cross section of a pickup and a camper to show in detail the mounting of the bracket to the frame of the pickup.

With reference to FIG. 3, the horizontal portion of the bracket 16 is fabricated from rectangular, hollow iron stock, and the face of a flat bar 14 near one of its ends is secured by a weld 21 to one end of the horizontal portion 16. One end of another flat bar 15 is welded to the upper surface of the rectangular portion 16 such that the sides of the bars 14 and 15 are parallel and the distance between the adjacent sides of the bars 14 and 15 is equal to the width of the frame of the pickup truck to which the bracket is to be attached. The vertical bar 15 is reinforced by an angle iron 22 that is welded in the corner formed by the side farthest from the bar 14 and the upper surface of the horizontal portion 16. A plurality of oppositely-placed pairs of holes 23 are drilled through the arms 14 and 15 to accommodate bolts 24 (FIG. 2) mounted both above and below the frame of the pickup truck. A sufficient number of holes can be spaced as required to accommodate frames of different depths. Additional strength can be obtained by fastening a rod 31 between the lower ends of the arms 14 of the two opposite brackets mounted to the frame.

The extension bar 17 is also rectangular in cross section and has slightly smaller cross sectional dimensions than those of the horizontal portions 16 so that it is a sliding fit longitudinally in the opening 25 of the horizontal portion. After the clamping portion of the bracket has been attached to the frame 29 of the pickup truck by bolts through the vertical portions 14 and 15, that end of the extension bar 17 opposite the chain 18 is pushed in the opening 25 of the horizontal portion 16 until a pair of holes 26 drilled through opposite sides of the extension bar 17 register with a pair of holes 27 drilled in opposite sides of the horizontal portion 16. A pin 28 is then pushed through the holes and is secured in place by a retaining pin 30.

The hold-down bracket of this invention contributes to safety because it is mounted directly to the frame of the pickup truck, and the force provided by the connecting chain is downward on both the camper and the bed of the truck. If the camper does not have a portion overhanging the side of the box of the pickup truck, a suitable bracket that extends beyond the side of the box can be attached to the camper, and the upper end of the chain 18 can be connected to the end of the bracket. The clamping portion of the bracket 11 does not deface the truck, and after it is installed, the extension bar 17 can be readily removed when the camper is not mounted on the truck so that the bracket is inconspicuous and does not extend beyond the side of the truck to snag passing objects.

What is claimed is:

1. A camper hold-down bracket comprising:
    a mounting bracket having a horizontal portion and a rigid vertical clamping portion secured to one end of said horizontal portion, and a chain having one end connected to the other end of said horizontal portion,
    said vertical clamping portion being adapted to be secured rigidly to the side portion of a frame of a pickup below the pickup box to direct said horizontal portion laterally outwardly below the body of the pickup and to position said other end of said horizontal portion rigidly beyond said body and below the overhanging side portion of said camper,
    said vertical clamping portion comprises first and second parallel flat bars extending upwardly from said horizontal portion, the sides of said flat bars being perpendicular to said horizontal portion, the distance between said spaced bars being slightly greater than the width of the portion of the frame below the body of a camper to which the hold-down bracket is to be attached, and a plurality of opposite mounting holes through said flat bars positioned to receive mounting bolts above and below the portion of the frame of the pickup, and
    means for attaching the other end of said chain to a fastener above the other end of said horizontal portion on the underside of said overhanging side portion and drawing said chain tight.

2. A hold-down bracket as claimed in claim 1 wherein said first parallel flat bar is adapted to be positioned along the inside surface of the side portion of the frame of a pickup below the pickup box and has its lower end extending downwardly below said horizontal portion, a tie to be connected between said lower end of said first parallel flat bar and the lower end of a similar flat bar positioned oppositely on the frame of the pickup, and the lower end of said flat bar adapted to receive said tie.

3. A hold-down bracket as claimed in claim 2 wherein said horizontal portion of said mounting bracket comprises a first member fabricated from hollow rectangular square stock having one end secured to said first and second flat bars, a second member fabricated from hollow rectangular square stock, the other end of said first member of square stock and one end of said second member of square stock being a sliding fit one within the other, a removable fastener disposed through said mating ends of said members of square stock, and said chain fastened to the other end of said second member of square stock.

References Cited

UNITED STATES PATENTS 3,655,234    4/1972    Kirschbaum    296—23 M C

PHILIP GOODMAN, Primary Examiner

U.S. Cl. X.R.

248—361